United States Patent
Gunther (10) Patent No.: US 9,998,549 B2
(45) Date of Patent: Jun. 12, 2018

(54) RESOURCE MANAGEMENT FOR STREAM RESERVATIONS

(71) Applicant: Harman International Industries, Incorporated, Stamford, CT (US)

(72) Inventor: Craig Gunther, Salt Lake City, UT (US)

(73) Assignee: Harman International Industries, Incorporated, Stamford, CT (US)

(*) Notice: Subject to any disclaimer, the term of this patent is extended or adjusted under 35 U.S.C. 154(b) by 288 days.

(21) Appl. No.: 14/812,641

(22) Filed: Jul. 29, 2015

(65) Prior Publication Data
US 2016/0036926 A1    Feb. 4, 2016

Related U.S. Application Data

(60) Provisional application No. 62/030,318, filed on Jul. 29, 2014.

(51) Int. Cl.
| | |
|---|---|
| *G06F 15/16* | (2006.01) |
| *H04L 29/08* | (2006.01) |
| *H04L 29/06* | (2006.01) |
| *H04N 21/436* | (2011.01) |
| *H04N 21/4363* | (2011.01) |

(52) U.S. Cl.
CPC .......... *H04L 67/16* (2013.01); *H04L 65/4069* (2013.01); *H04N 21/43615* (2013.01); *H04N 21/43637* (2013.01)

(58) Field of Classification Search
USPC ............ 709/206, 217; 370/399, 252; 463/42
See application file for complete search history.

(56) References Cited

U.S. PATENT DOCUMENTS

| | | | | |
|---|---|---|---|---|
| 5,519,707 A | * | 5/1996 | Subramanian | .......... H04L 29/06 370/399 |
| 2004/0087367 A1 | * | 5/2004 | Hendrickson | ......... G06F 9/5038 463/42 |
| 2007/0028288 A1 | * | 2/2007 | Sigmon, Jr. | ....... G06F 17/30905 725/136 |
| 2012/0284739 A1 | * | 11/2012 | Gunther | .............. H04L 65/1069 725/18 |

(Continued)

OTHER PUBLICATIONS

European Patent Office, Extended European Search Report Issued in Application No. 15178586.2, dated Oct. 29, 2015, Germany, 7 pages.

(Continued)

*Primary Examiner* — Tammy Nguyen
(74) *Attorney, Agent, or Firm* — McCoy Russell LLP (57) ABSTRACT

Embodiments are disclosed for networked computing devices and methods of managing talker and listener attributes in a network. In some embodiments, a computing device comprises a networking device that receives and propagates data streams and information relating to the data streams to other devices in a network and a processor. The computing device also comprises a storage device that stores the information related to the data streams and instructions executable by the processor to receive a first talker attribute, selectively discard a second talker attribute, the second talker attribute being stored on the storage device prior to receiving the first talker attribute, and store the first talker attribute.

20 Claims, 5 Drawing Sheets

(56) References Cited

U.S. PATENT DOCUMENTS

2012/0314597 A1* 12/2012 Singh .................. H04L 43/0882
370/252
2013/0166674 A1* 6/2013 Olsen ...................... H04L 69/08
709/217

OTHER PUBLICATIONS

IEEE Standards Association, "Media Access Control (MAC) Bridges and Virtual Bridge Local Area Networks," IEEE, Aug. 31, 2011, 1,365 pages (submitted in two parts).
IEEE Standards Association, "Audio Video Bridging (AVB) Systems," IEEE, Sep. 30, 2011, 45 pages.

* cited by examiner

RESOURCE MANAGEMENT FOR STREAM RESERVATIONS

CROSS REFERENCE TO RELATED APPLICATIONS

The present application claims priority to U.S. Provisional Patent Application No. 62/030,318, entitled "RESOURCE MANAGEMENT FOR STREAM RESERVATIONS," filed on Jul. 29, 2014, the entire contents of which are hereby incorporated by reference for all purposes.

FIELD

The disclosure relates to implementing stream reservations for network devices.

BACKGROUND

Data streams that are sent from a source device may be advertised to one or more listeners via network devices, such as switches, bridges, etc. The network devices may selectively propagate advertisements of the data streams based upon an availability of resources at the switch. A listener may subscribe to an advertised data stream by sending a request to receive the stream to a network device that is in communication with the listener.

SUMMARY

Embodiments are disclosed for networked computing devices and methods of managing talker and listener attributes in a network. In some embodiments, a computing device comprises a networking device that receives and propagates data streams and information relating to the data streams to other devices in a network and a processor. The computing device also comprises a storage device that stores the information related to the data streams and instructions executable by the processor to receive a first talker attribute, selectively discard a second talker attribute, the second talker attribute being stored on the storage device prior to receiving the first talker attribute, and store the first talker attribute.

Embodiments are further disclosed for a method of managing incoming talker attributes in a networked computing device. In some embodiments, a method includes receiving a first talker attribute identifying an advertised data stream, determining if the first talker attribute is already stored in memory, and, responsive to determining that the first talker attribute is not already stored in memory, determining if the networked computing device has memory available to store the first talker attribute. The method may further include, responsive to determining that the networked computing device does not have memory available to store the first talker attribute, determining if the networked computing device has stored a listener attribute identifying the advertised data stream, and selectively discarding a second talker attribute responsive to determining that the networked computing device has stored a listener attribute identifying the advertised data stream.

Embodiments for a method of managing incoming listener attributes are further disclosed. In some embodiments, a method includes receiving a listener attribute identifying a requested data stream, determining if the listener attribute is stored in a storage device of the networked computing device, and, responsive to determining that the listener attribute is not stored on the memory device, determining if the storage device has available memory for storing the listener attribute. The method may further include, responsive to determining that the storage device does not have available memory for storing the listener attribute, selectively discarding a talker attribute stored on the networked computing device.

BRIEF DESCRIPTION OF THE DRAWINGS

The disclosure may be better understood from reading the following description of non-limiting embodiments, with reference to the attached drawings, wherein below.

DETAILED DESCRIPTION

Data streams (e.g., audio/video media streams) that follow a reserved path through a network may originate from a talker device (e.g., a DVD player or other audio/video source device) and terminate at one or more listener devices (e.g., a television or other audio/video sink device). Each talker may advertise available stream(s) to every device in the network via network switches or other network devices in accordance with a suitable protocol, such as the Stream Reservation Protocol (SRP) described in IEEE 802.1-2011, Clause 35 (the entire contents of which are incorporated herein by reference) and utilized in Audio Video Bridging systems (described in IEEE 802.1BA-2011, the entire contents of which incorporated herein by reference). The switches may be configured to store the talker advertisement information internally in case a listener device wishes to attach to that stream at some future time. Networks often contain a mixture of switches with some switches including more resources than other switches.

During operation, switches may propagate talker advertisements in the direction away from the talker. As each switch propagates the talker information it will send it as a Talker Advertise if the switch has enough resources to support the stream, or as a Talker Failed if the switch does not have enough resources. As defined in SRP both the Talker Advertise and Talker Failed information must be stored by the switch. Presently, the behavior of SRP is undefined when switches run out of memory resources, which may lead to unpredictable responses to such conditions or difficulty in correcting such issues. This disclosure describes a switch that is configured to store and propagate talker information until available memory resources are exhausted; at which point the switch may selectively forward all talker information as Talker Failed messages, set a Reservation Failure Code to (10) Out of MSRP resources, and not store the associated talker information. The switch may also selectively attempt to free memory by removing outdated, uninteresting, unused, or otherwise low priority stored attributes (e.g., listener or talker information received via listener or talker advertise/fail messages). By taking advantages of procedures that are already in place in existing SRP systems and layering additional processes for establishing a defined response to the depletion of resources over the Stream Reservation Protocol, this disclosure provides a way to detect and mitigate such depletion. In this way, more reliable network operations may be performed compared to systems that do not designate a response to resource depletion in transit nodes of the network.

Figure 1A:
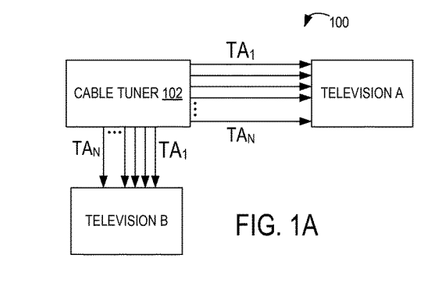
FIGS. 1A-1C schematically show an example networking system including a data source configured to provide audio/video data to one or more data sinks in the form of televised channels in accordance with one or more embodiments of the present disclosure.
Figure 1B:
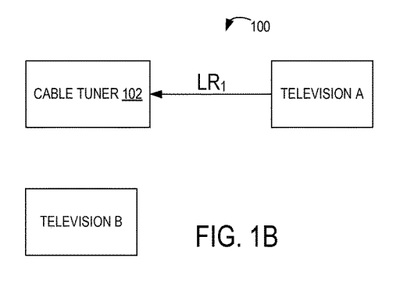
Figure 1C:
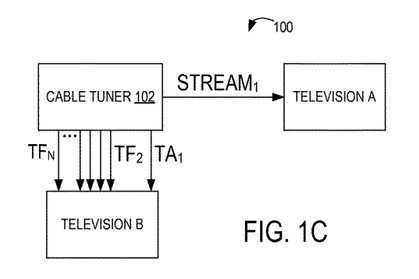

FIGS. 1A-1C show an example home networking system 100 including a data source (e.g., cable tuner 102) configured to provide audio/video data to one or more data sinks (e.g., television A and television B in FIG. 1A) in the form of televised channels. Cable tuner 102 may be a networked computing device having a bandwidth capacity that is substantially equal to one televised channel's worth of streamed data. In other words, cable tuner 102 may only be capable of transmitting one channel at a time. As illustrated in FIG. 1A, cable tuner 102 may provide a plurality of Talker Advertise messages $TA_1$-$TA_N$ to each of television A and television B, such that each available channel (e.g., channels 1-N) is advertised to the televisions. In FIG. 1B, television A sends a Listener Ready message $LR_1$ to cable tuner 102 indicating a selection of a channel for receiving at the television. For example, $LR_1$ may be transmitted responsive to a user input indicating that the user intends to view televised content on channel 1.

As shown in FIG. 1C, cable tuner 102 may begin transmitting $stream_1$ (e.g., an audio/video data stream comprising content from the selected television channel 1 identified in the Listener Ready message $LR_1$) to television A as requested. Since cable tuner 102 is bandwidth-limited to transmitting one televised channel at a time in this example, the Talker Advertise messages $TA_2$-$TA_N$ directed to television B are changed to Talker Failed messages $TF_2$-$TF_N$. Talker Advertise message $TA_1$ may still be transmitted as the cable tuner 102 may be able to accommodate the transmission of the associated channel to both television A and television B. Accordingly, if a user were to request a different channel (e.g., channel 2) to be transmitted to television B, an error message derived from TF2 may be sent to television B to indicate that the channel is unable to be broadcast due to a lack of resource availability.

Figure 2:
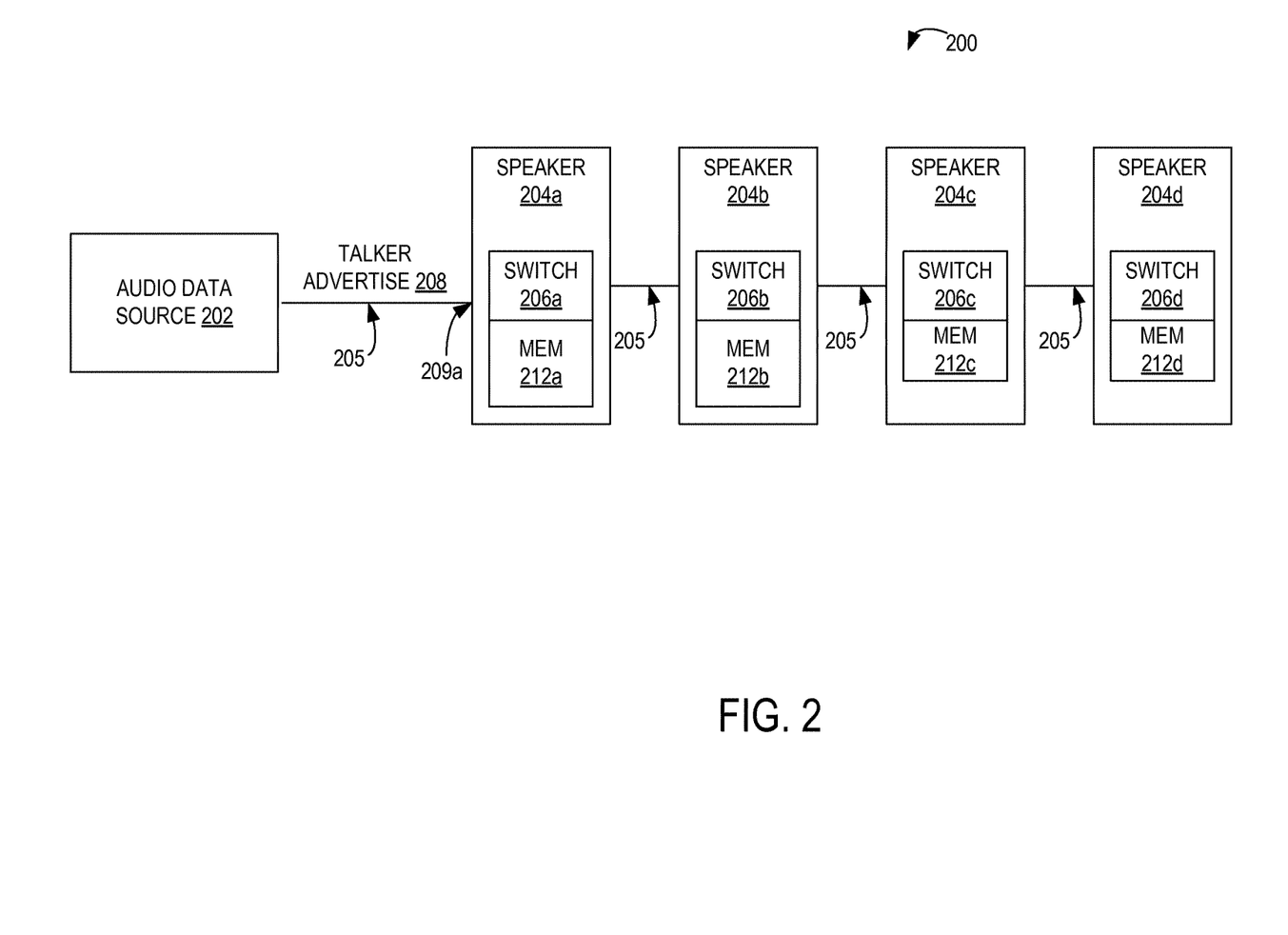
FIG. 2 schematically shows another example network including an audio data source and a plurality of speakers in accordance with one or more embodiments of the present disclosure.

FIGS. 1A-1C illustrate an example of responses to a lack of bandwidth resources. However, other resources may affect the propagation of Talker Advertise and Talker Failed messages. For example, FIG. 2 illustrates an example in which available memory affects the storage of Talker Advertise messages. FIG. 2 shows an example network 200 including a talker computing device (e.g., audio data source 202) and a plurality of listener computing devices (e.g., speakers 204a-204d). Each speaker may exhibit switch behavior in the illustrated example, as each speaker may include a networking device such as switch 206a-206d for receiving and propagating data. The speakers may include one or more logic devices and storage devices (e.g., processors and memory) for executing stored instructions to process incoming data, allocate resources for incoming streams, etc. As shown, the speakers may be arranged in a daisy chain configuration such that the speakers are communicatively connected to propagate data to a next speaker in the chain and/or to receive data from a prior speaker in the chain based on the location of the speaker within the chain. The speakers may be connected to one another and the audio data source via any suitable wired or wireless communication link 205, including but not limited to Ethernet, WiFi, BLUETOOTH, etc. For example, each speaker may include a wireless transceiver configured to receive and transmit radiofrequency signals from one or more data sources, other speakers, and/or other suitable devices. In some embodiments, a first speaker in a daisy chain may be connected to an audio data source via a different type of communication link than the communication links between the speakers. In other embodiments, one or more different types of communication links may be provided between different speakers in the daisy chain. It is to be understood that the illustrated configuration (e.g., physical layout, communication links, etc.) is exemplary and any suitable configuration of talkers and listeners may be utilized to provide the communication described herein.

Upon determining that a data stream is available for propagation to the speakers, audio data source 202 may transmit a Talker Advertise message 208 indicating the presence and availability of the data stream. As each speaker may serve as a node (e.g., a transit node or an end node) or a switch/bridge along the path of the advertised data stream, each speaker may attempt to allocate resources for the data stream (e.g., check for bandwidth availability on associated output ports of a switch 206a-206d of the speaker) in response to receiving the Talker Advertise message on an associated port (e.g., ingress port 209a of speaker 204a). Some of the speakers may have different resources available to accommodate the Talker Advertise. For example, speakers 204a and 204b may have larger capacity memory storage devices (e.g., memory 212a and 212b) than the memory storage devices of speakers 204c and 204d (e.g., memory 212c and 212d).

As described above, upon receiving the Talker Advertise, each speaker may attempt to store and propagate the talker information. While speakers 204a and 204b may successfully perform such actions, speaker 204c may not have enough available memory in memory storage device 212c to store the talker information. Accordingly, based on the available memory space in each of the speakers, the Talker Advertise may be stored and propagated by speakers 204a and 204b, but may not be able to be stored by speaker 204c. In other systems that employ SRP, the Talker Advertise may be dropped by speaker 204c and talker information may not be forwarded to other nodes of the network (e.g., speaker 204d). However, in accordance with the present disclosure, speaker 204c may selectively attempt to remove elements stored in memory (e.g., unused or uninteresting Talker Advertise messages, which may still be valid, but have no listeners down this branch of the network that are interested in the messages) to free up space for storing the incoming Talker Advertise message and/or accommodate the stream identified by the incoming Talker Advertise message. For example, the uninteresting Talker Advertise messages may be designated as uninteresting based on the determination that no Listener Ready messages have been received for the Talker Advertise message from any one of the listeners downstream from that listener and/or if each of the listeners downstream from that listener did not send a Listener Ready message associated with that Talker Advertise message. Accordingly, if a Listener Ready message arrives at speaker 204a and/or 204b requesting the stream identified in Talker Advertise message 208, speakers 204a and/or 204b are able to serve the listener (e.g., playback the audio stream associated with the Talker Advertise message 208), even if the Talker Advertise message is not stored later in the daisy chain (e.g., at speakers 204c and 204d).

Figure 3:
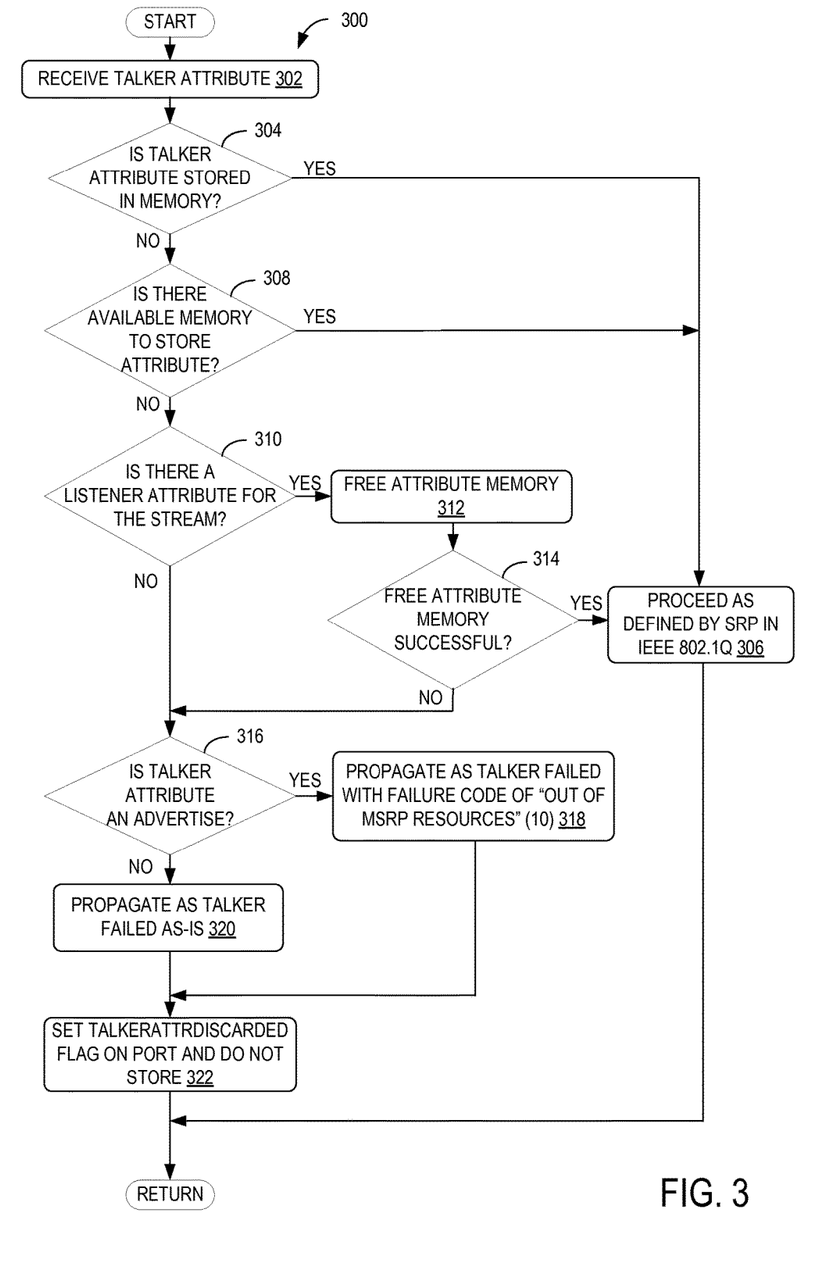
FIG. 3 is a flow chart of a method for managing incoming talker attributes in accordance with one or more embodiments of the present disclosure.

FIG. 3 shows a method 300 for managing talker attributes (e.g., Talker Advertise and Talker Failed messages), which may be performed at a switch or other node of a network (e.g., switch 206a-d of speakers 204a-d as illustrated in FIG. 2) by executing, with a processor, instructions stored on a memory device. At 302, method 300 includes receiving a talker attribute. For example, the talker attribute may be received at a node of a network, such as a switch of speaker 204a of FIG. 2. At 304, the method includes determining if the talker attribute is already stored in memory (e.g., the memory associated with the switch). If the talker attribute is already stored in memory (e.g., "YES" at 304), the method proceeds to 306 to proceed as defined by SRP in IEEE 802.1Q. In other words, if the talker attribute is already stored in memory, it is not necessary to store it again, so the talker attribute may be propagated as necessary.

If the talker attribute is not stored in memory (e.g., "NO" at 304), the method proceeds to 308 to determine whether there is enough available memory to store the attribute. If there is sufficient memory (e.g., if the attribute may be stored without exceeding the remaining storage capacity of the memory device and/or without exceeding a threshold capacity level of the memory device—"YES" at 308), the method proceeds to 306 to adhere to SRP. If sufficient memory is not available (e.g., if the talker attribute is a new attribute and there is no room to store it and/or if the talker attribute was previously discarded—"NO" at 308), the method proceeds to 310 to determine whether there is a listener attribute stored in memory for the stream identified in the talker attribute. A listener attribute for the stream identified in the talker attribute may indicate the presence of a listener device that has requested the stream. If there is a listener attribute for the stream (e.g., "YES" at 310), a listener may be available and/or requesting to receive the stream and steps may be taken to attempt to manage resources at the network node (e.g., a memory device associated with a switch) to accommodate the incoming talker attribute received at 302. Accordingly, the method may proceed to 312 to attempt to free attribute memory.

Figure 4:
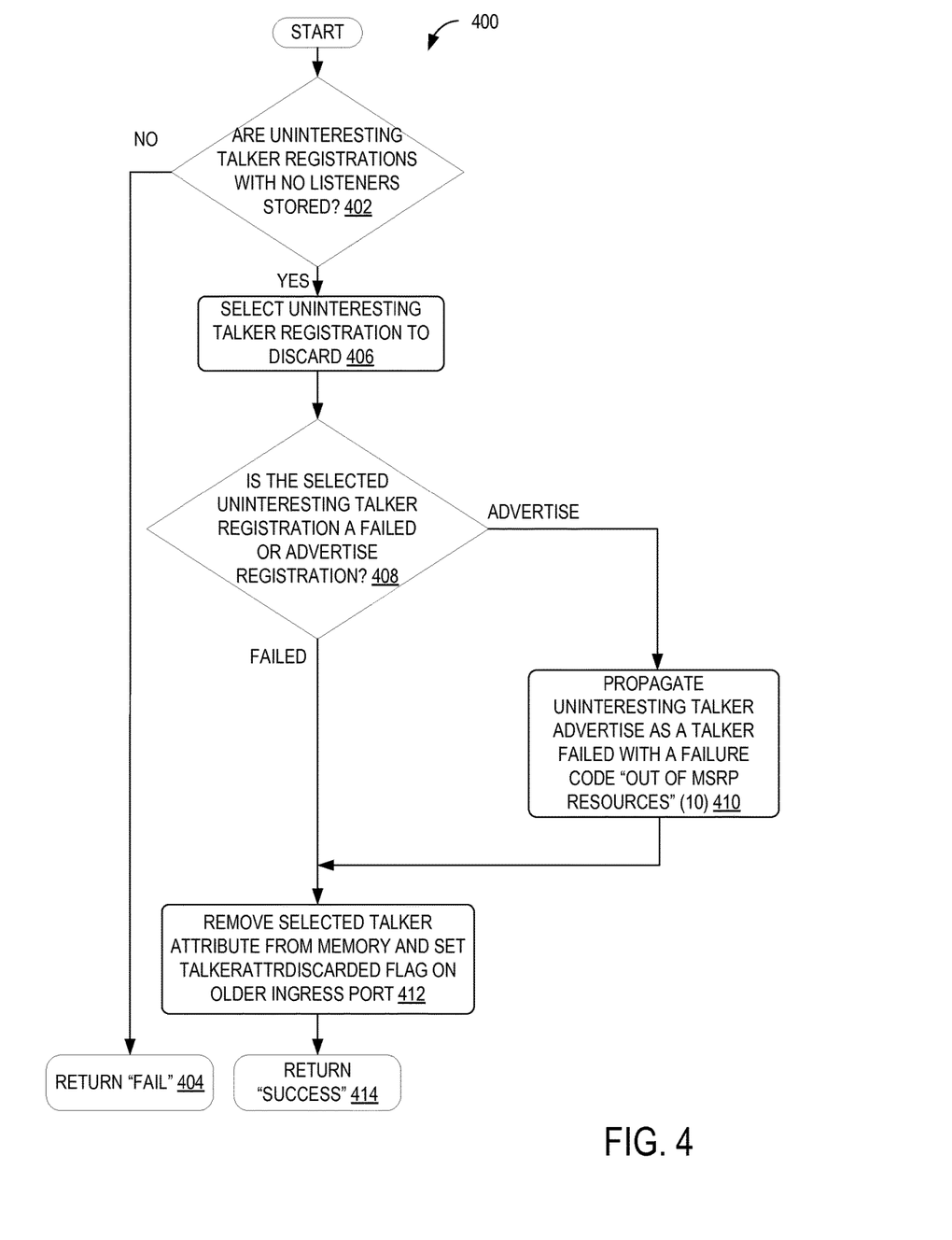
FIG. 4 is a flow chart of a method for selectively freeing attribute memory in a networking device in accordance with one or more embodiments of the present disclosure.

Turning briefly to FIG. 4, an example method 400 for attempting to free attribute memory, which may be performed at 312 of FIG. 3, is shown. Method 400 may be performed at a switch or other node of a network (e.g., switch 206a-d of speakers 204a-d as illustrated in FIG. 2) by executing, with a processor, instructions stored on a memory device. At 402, method 400 includes determining if uninteresting talker registrations with no associated listeners are stored. Uninteresting talker registrations may include talker registrations that are time stamped and/or were stored/received at any time prior to a most recent (e.g., an incoming) talker attribute. Uninteresting talker registrations may additionally or alternatively include talker registrations that are time stamped and/or were stored/received longer than a threshold time prior to a receipt/attempted storage time of a most recent (e.g., an incoming) talker attribute. In other embodiments, uninteresting talker registration may include talker registrations that are newer (e.g., time stamped/stored/received after a receipt/attempted storage time of an incoming talker attribute). The determination at 402 may indicate whether outdated, uninteresting, unused, or otherwise low priority data is being stored in the memory of a network node (e.g., the memory associated with a switch in the network). If there are no uninteresting talker registrations with no listeners stored (e.g., "NO" at 402), the method proceeds to 404 to return an indication of failure to free memory resources. For example, if the storage device is full of data other than talker attributes and/or only stores new talker attributes and/or talker attributes with associated listener attributes (indicating that a listener is receiving or requesting to receive the stream associated with the talker attributes), removing such stored data may disrupt operations of the network.

Conversely, if one or more uninteresting talker registrations without associated listeners is stored in memory (e.g., "YES" at 402), the method proceeds to 406 to select one of the uninteresting talker registrations to discard. At 408, the method includes determining if the selected uninteresting talker registration is a failed registration (e.g., stored data relating to a Talker Failed message) or an advertise registration (e.g., stored data relating to a Talker Advertise message). If the selected uninteresting talker registration is an advertise registration (e.g., "ADVERTISE" at 408), the method proceeds to 410 to propagate the uninteresting Talker Advertise message as a Talker Failed message with a failure code of "Out of MSRP Resources," which may be designated with a failure code number 10. If the selected uninteresting talker registration is a failed registration (e.g., "FAILED" at 408), the uninteresting talker registration would have already been propagated as a Talker Failed and the method proceeds to 412 to remove the selected talker attribute from memory and set a TalkerAttrDiscarded flag (e.g., an indication that a talker attribute has been discarded) on an ingress port associated with the uninteresting talker registration. The TalkerAttrDiscarded flag may be cleared on the ingress port when a Talker LeaveAll Event (e.g., a redeclaration of talker attributes) is processed on that port. The clearing may be performed before processing any attributes associated with the LeaveAll Event. After removing the talker attribute from memory, the method proceeds to 414 to return a "success" indication indicating that memory resources were successfully freed by releasing a stored uninteresting talker registration. The "fail" and "success" indications at 404 and 414, respectively, may be provided to the switch to determine whether the free attribute memory process was successful (e.g., at decision block 314 of FIG. 3).

Returning to FIG. 3, if the free attribute memory process was successful (e.g., "YES" at 314), the method proceeds as defined by SRP in IEEE 802.1Q, as indicated at 306. For example, if memory is available to store the talker attribute after freeing up memory at 312, the talker attribute may be stored and propagated to a next node in the network. If the free attribute memory process was not successful (e.g., "NO" at 314), the method proceeds to 316 to determine if the talker attribute is a Talker Advertise. If the talker attribute is a Talker Advertise (e.g., "YES" at 316), the method proceeds to 318 to propagate the talker attribute as a Talker Failed with the failure code of "Out of MSRP Resources" and/or the numerical code designating such a type of failure (e.g., failure code 10). In other words, a failure to free attribute memory may result in too few resources being able to handle the stream identified in the Talker Advertise. If the talker attribute is not an advertise message (e.g., if the talker attribute is a Talker Failed, "NO" at 316), the method proceeds to 320 to propagate the Talker Failed as is. After propagating the Talker Failed (e.g., either the Talker Failed generated at 318 or the as-is Talker Failed at 320), the method includes setting a TalkerAttDiscarded flag on the ingress port associated with the talker attribute (e.g., the port at which the talker attribute was received) and not storing or otherwise discarding the talker attribute, as indicated at 322.

Figure 5:
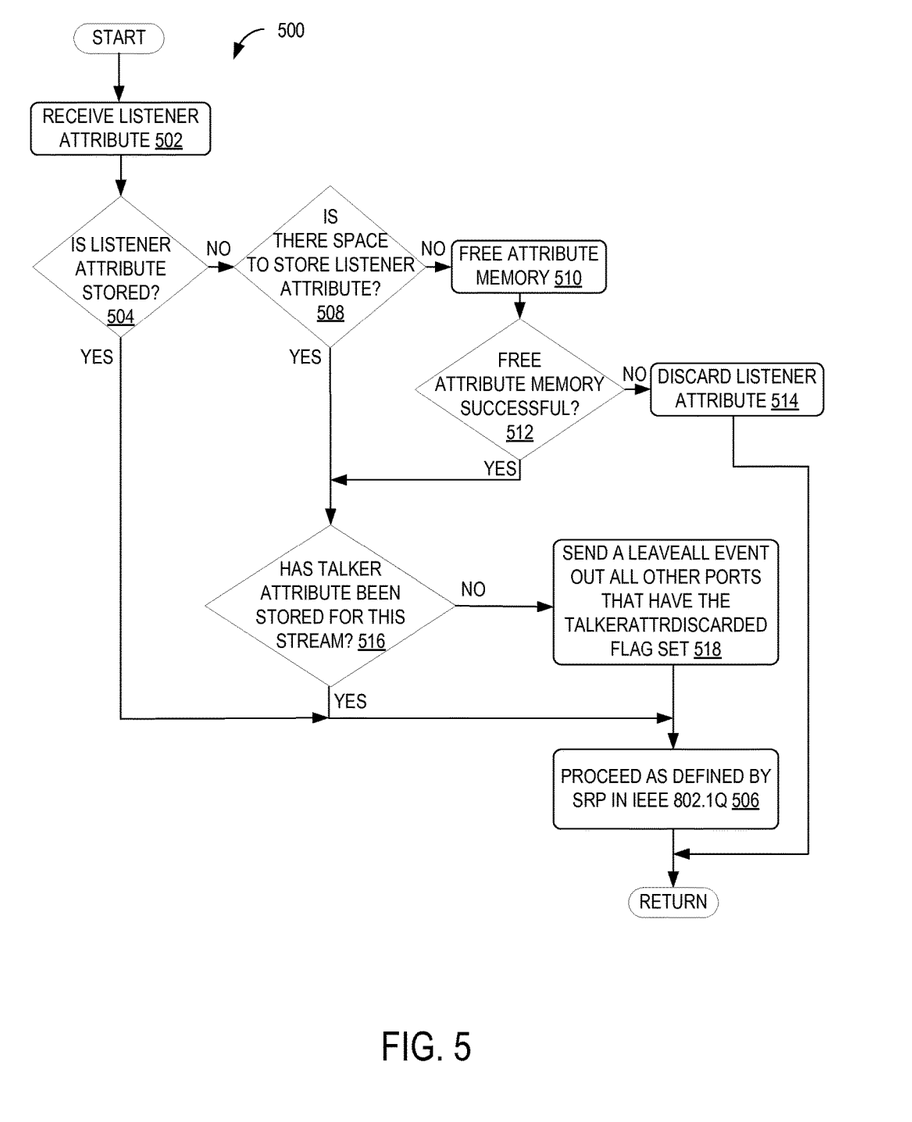
FIG. 5 is a flow chart of a method for managing incoming listener attributes in accordance with one or more embodiments of the present disclosure.

A similar process to that described in FIG. 3 may be performed to selectively store and propagate incoming listener attributes (e.g., Listener Ready or Listener Asking messages indicating a listener's attempt to subscribe to or otherwise receive a stream from a talker). For example, FIG. 5 is a flow chart of a method 500 for managing incoming listener attributes at a switch or other network node, which may be performed at the switch or other network node (e.g., switch 206a-d of speakers 204a-d as illustrated in FIG. 2) by executing, with a processor, instructions stored on a memory device. At 502, method 500 includes receiving a listener attribute. At 504, the method includes determining if the listener attribute is already stored in a memory device associated with the switch. If the listener attribute is already stored (e.g., "YES" at 504), there is no need to attempt to store the attribute again, and the method proceeds to 506 to continue as defined by SRP in IEEE 802.1Q. For example, the listener attribute may be propagated to a next switch or node in the network.

If the listener attribute is not already stored in memory (e.g., "NO" at 504), the method may proceed to 508 to determine if there is enough free/available memory storage space to store the listener attribute. If there is not enough available memory (e.g., "NO" at 508), the method proceeds to 510 to perform a free attribute memory routine. For example, the free attribute memory routine 400 described in FIG. 4 may be performed at 510. At 512, the method includes determining if the free attribute memory routine was successful (e.g., whether memory was freed by discarding a previously stored and low priority/uninteresting talker attribute). If the free memory attribute was not successful (e.g., if the memory resources are still not available to store the incoming listener attribute due to an inability to discard already-stored data, "NO" at 512), the method proceeds to 514 to discard the listener attribute, as the stream cannot be established with the available resources at the switch. In some embodiments, a failure message may be transmitted to the listener in order to inform the listener of the failure and/or of a reason for the failure.

If the free memory attribute was successful (e.g., if memory resources were freed by discarding uninteresting/low-priority talker attributes, "YES" at 512), the method proceeds to 516 to determine if a talker attribute has been stored (e.g., is present in memory) for the stream identified in the listener attribute. If the talker attribute has been stored for the stream identified in the listener attribute (e.g., "YES" at 516), the stream may be established and the method may proceed as defined by SRP in IEEE 802.1Q at 506 to provide the stream to the listener. If the talker attribute has not been stored for the stream identified in the listener attribute (e.g., "NO" at 516), the method proceeds to 518 to send a LeaveAll Event (e.g., a request to redeclare Talker attributes) to all other ports that have the TalkerAttrDiscarded flag set. The absence of the talker attribute may indicate that the attribute was discarded at an earlier point in time. As described above, discarded attributes may trigger the setting of the TalkerAttrDiscarded flag, so sending a LeaveAll Event to ports that have this flag set may speed up the time it takes to create a reservation related to discarded attributes by focusing the redeclaration on ports that may be missing attributes. After sending the LeaveAll Event, the method proceeds to 506 to continue as defined by SRP in IEEE 802.1Q. For example, the talker attribute associated with the stream identified in the incoming listener attribute may be stored responsive to the LeaveAll Event and the stream may be registered and provided to the listener as detailed in IEEE 802.1Q.

By dynamically freeing memory resources by selectively discarding stored or incoming talker and listener attributes, switches or other devices that exhibit switch behavior may participate in larger networks regardless of differences in available resources. While a switch may still allow the same number of streams to flow through when using the modified Stream Reservation Protocol methods provided in the present disclosure as the same switch using the present Stream Reservation Protocol defined in IEEE 802.1Q, the switch of the present disclosure may exist and operate on networks that advertise many more streams than the switch has resources to support. Instead of ignoring incoming talker/listener attributes when resources become scarce, the switches of the present disclosure may additionally prioritize talker attributes and selectively discard uninteresting/low priority talker attributes to allow higher priority talker attributes to be stored rather than ignored.

The technical effect of selectively discarding uninteresting or low priority talker attributes is that resources are then made available for higher priority talker attributes, thereby reducing any resource depletion that may occur at the switch of the network devices. In this way, network operations and propagation of data streams in the network devices may be performed more efficiently and reliably. Further, in comparison to other network devices, the network devices of the present disclosure may operate more efficiently and service more data stream requests while storage and other resources are managed as described herein.

The systems and methods described above also provide for a computing device comprising a networking device that receives and propagates data streams and information relating to the data streams to other devices in a network, a processor, and a storage device that stores the information related to the data streams and instructions executable by the processor to receive a first talker attribute, selectively discard a second talker attribute, the second talker attribute being stored on the storage device prior to receiving the first talker attribute, and store the first talker attribute. In a first example of the computing device, selectively discarding the second talker attribute may additionally or alternatively comprise discarding the second talker attribute responsive to determining that the storage device does not have memory available to store the talker attribute. A second example of the computing device optionally includes the first example and further includes wherein the second talker attribute identifies an advertised stream and wherein the second talker attribute is selected from a plurality of stored talker attributes based on an absence of a listener attribute identifying the advertised stream in the storage device. A third example of the computing device optionally includes one or more of the first and second examples, and further includes wherein determining if the second talker attribute is a Talker Advertise or a Talker Failed and propagating a Talker Failed to another networking device in the network with a failure code indicating that the networking device is out of resources responsive to determining that the second talker attribute is a Talker Advertise. A fourth example of the computing device optionally includes one or more of the first through third examples, and further includes wherein selectively discarding the second talker attribute further comprises removing the second talker attribute from the storage device and setting a flag indicating that the second talker attribute was discarded, the flag being set on an ingress port of the networking device associated with the second talker attribute. A fifth example of the computing device optionally includes one or more of the first through fourth examples and further includes wherein the first talker attribute identifies an advertised data stream and wherein selectively discarding the second talker attribute further comprises not discarding the second talker attribute responsive to determining that the storage device does not store a listener attribute identifying the advertised data stream. A sixth example of the computing device optionally includes one or more of the first through fifth examples and further includes propagating the first talker attribute as a Talker Failed, discarding the talker attribute, and setting a flag indicating that the first talker attribute was discarded responsive to determining that that storage device does not store a listener attribute identifying the advertised data stream. A seventh example of the computing device optionally includes one or more of the first through sixth examples further includes wherein the instructions are further executable to register an advertised stream identified by the first talker attribute as defined in Stream Reservation Protocol of IEEE 802.1Q responsive to storing the first talker attribute.

The systems and methods described above also provide for a method of managing incoming talker attributes in a networked computing device, the method comprising receiving a first talker attribute identifying an advertised data stream, determining if the first talker attribute is already stored in memory, responsive to determining that the first talker attribute is not already stored in memory, determining if the networked computing device has memory available to store the first talker attribute, responsive to determining that the networked computing device does not have memory available to store the first talker attribute, determining if the networked computing device has stored a listener attribute identifying the advertised data stream, and selectively discarding a second talker attribute responsive to determining that the networked computing device has stored a listener attribute identifying the advertised data stream. In a first example of the method, responsive to determining that the networked computing device has not stored a listener attribute identifying the advertised data stream, the method may additionally or alternatively propagate the first talker attribute as a Talker Failed, discard the first talker attribute, and setting a flag on a port of the networked computing device indicating that the first talker attribute was discarded. A second example of the method optionally includes the first example, and further includes wherein a plurality of uninteresting talker attributes are stored at the networked computing device prior to receiving the first talker attribute, each uninteresting talker attribute identifying an uninteresting advertised data stream, and wherein selectively discarding the second talker attribute comprises not discarding the second talker attribute, propagating the first talker attribute as a Talker Failed, discarding the first talker attribute, and setting a flag on an ingress port of the networked computing device indicating that the first talker attribute was discarded responsive to determining that at least one listener attribute identifying each uninteresting advertised data stream is stored in the networked computing device. A third example of the method optionally includes one or more of the first and second examples, and further includes wherein selectively discarding the second talker attribute comprises discarding the second talker attribute responsive to determining that the uninteresting advertised data stream identified by the second talker attribute is not identified by a listener attribute stored on the networked computing device. A fourth example of the method optionally includes one or more of the first through the third examples, and further includes wherein discarding the second talker attribute comprises removing the second talker attribute from memory and setting a flag associated with an ingress port of the networked computing device indicating that the second talker attribute was discarded. A fifth example of the method optionally includes one or more of the first through fourth examples, and further includes registering the first talker attribute as defined in Stream Reservation Protocol of IEEE 802.1Q responsive to storing the first talker attribute.

The systems and methods described above also provide for a method of managing received listener attributes in a networked computing device, the method comprising receiving a listener attribute identifying a requested data stream, determining if the listener attribute is stored in a storage device of the networked computing device, responsive to determining that the listener attribute is not stored on the memory device, determining if the storage device has available memory for storing the listener attribute, and responsive to determining that the storage device does not have available memory for storing the listener attribute, selectively discarding a talker attribute stored on the networked computing device. In a first example of the method, responsive to determining that the storage device does have available memory for storing the listener attribute, the method may additionally or alternatively determine that a talker attribute identifying the requested data stream is not stored on the networked computing device and send a LeaveAll Event out on all other ports that have a discard flag set, the discard flag for each port indicating that a talker attribute that was learned from that port has been discarded from that port. A second example of the method optionally includes the first example, and further includes wherein selectively discarding the talker attribute comprises not discarding the talker attribute and discarding the listener attribute responsive to determining that each talker attribute stored on the networked computing device identifies an advertised stream that is identified in an associated stored listener attribute on the networked computing device. A third example of the method optionally includes one or more of the first and second examples, and further includes wherein selectively discarding the talker attribute comprises discarding the talker attribute responsive to determining that an advertised data stream identified by the talker attribute is not identified by a stored listener attribute stored on the networked computing device. A fourth example of the method optionally includes one or more of the first through the third examples, and further includes wherein selectively discarding the talker attribute comprises propagating the talker attribute as a Talker Failed, discarding the talker attribute, and setting a flag on an ingress port of the networked computing device indicating that the talker attribute was discarded responsive to determining that an advertised data stream identified by the talker attribute is not identified by a stored listener attribute stored on the networked computing device. A fifth example of the method optionally includes one or more of the first through the fourth examples, and further includes registering the listener attribute as defined by Stream Reservation Protocol in IEEE 802.1Q responsive to determining that the listener attribute is stored on the networked computing device.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the switches 206a-206d of speakers 204a-204d illustrated in FIG. 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A computing device comprising:
a networking device that receives and propagates data streams and information relating to the data streams to other devices in a network;
a processor; and
a storage device that stores the information related to the data streams and instructions executable by the processor to:
receive a first talker attribute;
while operating in a first condition, discard a second talker attribute and store the first talker attribute, the second talker attribute being stored on the storage device prior to receiving the first talker attribute; and
while operating in a second condition, store the first talker attribute.

2. The computing device of claim 1, wherein discarding the second talker attribute comprises discarding the second talker attribute responsive to determining that the storage device does not have memory available to store the first talker attribute.

3. The computing device of claim 1, wherein the second talker attribute identifies an advertised stream and wherein the second talker attribute is selected from a plurality of stored talker attributes based on an absence of a listener attribute identifying the advertised stream in the storage device.

4. The computing device of claim 1, further comprising determining if the second talker attribute is a Talker Advertise or a Talker Failed and propagating a Talker Failed to another networking device in the network with a failure code indicating that the networking device is out of resources responsive to determining that the second talker attribute is a Talker Advertise.

5. The computing device of claim 1, wherein discarding the second talker attribute further comprises removing the second talker attribute from the storage device and setting a flag indicating that the second talker attribute was discarded, the flag being set on an ingress port of the networking device associated with the second talker attribute.

6. The computing device of claim 1, wherein the first talker attribute identifies an advertised data stream and wherein the instructions are further executable by the processor to, while operating in the second condition, not discard the second talker attribute responsive to determining that the storage device does not store a listener attribute identifying the advertised data stream.

7. The computing device of claim 6, further comprising propagating the first talker attribute as a Talker Failed, discarding the first talker attribute, and setting a flag indicating that the first talker attribute was discarded responsive to determining that the storage device does not store a listener attribute identifying the advertised data stream.

8. The computing device of claim 1, wherein the instructions are further executable to register an advertised stream identified by the first talker attribute as defined in Stream Reservation Protocol of IEEE 802.1Q responsive to storing the first talker attribute.

9. A method of managing incoming talker attributes in a networked computing device, the method comprising:
receiving a first talker attribute identifying an advertised data stream;
determining if the first talker attribute is already stored in memory;
responsive to determining that the first talker attribute is not already stored in memory, determining if the networked computing device has memory available to store the first talker attribute;
responsive to determining that the networked computing device does not have memory available to store the first talker attribute, determining if the networked computing device has stored a listener attribute identifying the advertised data stream;
while operating in a first condition, discarding a second talker attribute responsive to determining that the networked computing device has stored a listener attribute identifying the advertised data stream; and
while operating in a second condition, not discarding the second talker attribute responsive to determining that the networked computing device has not stored the listener attribute identifying the advertised data stream.

10. The method of claim 9, further comprising, responsive to determining that the networked computing device has not stored a listener attribute identifying the advertised data stream, propagating the first talker attribute as a Talker Failed, discarding the first talker attribute, and setting a flag on a port of the networked computing device indicating that the first talker attribute was discarded.

11. The method of claim 9, wherein a plurality of uninteresting talker attributes are stored at the networked computing device prior to receiving the first talker attribute, each uninteresting talker attribute identifying an uninteresting advertised data stream, and the method further comprising, while operating in the second condition, propagating the first talker attribute as a Talker Failed, discarding the first talker attribute, and setting a flag on an ingress port of the networked computing device indicating that the first talker attribute was discarded responsive to determining that at least one listener attribute identifying each uninteresting advertised data stream is stored in the networked computing device.

12. The method of claim 11, wherein discarding the second talker attribute while operating in the first condition comprises discarding the second talker attribute responsive to determining that the uninteresting advertised data stream identified by the second talker attribute is not identified by a listener attribute stored on the networked computing device.

13. The method of claim 12, wherein discarding the second talker attribute comprises removing the second talker attribute from memory and setting a flag associated with an ingress port of the networked computing device indicating that the second talker attribute was discarded.

14. The method of claim 9, further comprising registering the first talker attribute as defined in Stream Reservation Protocol of IEEE 802.1Q responsive to storing the first talker attribute.

15. A method of managing received listener attributes in a networked computing device, the method comprising:
   receiving a listener attribute identifying a requested data stream;
   determining if the listener attribute is stored in a storage device of the networked computing device;
   responsive to determining that the listener attribute is not stored on the storage device, determining if the storage device has available memory for storing the listener attribute;
   responsive to determining that the storage device does not have available memory for storing the listener attribute while operating in a first condition, discarding a talker attribute stored on the networked computing device; and
   responsive to determining that the storage device does not have available memory for storing the listener attribute while operating in a second condition, not discarding the talker attribute stored on the networked computing device.

16. The method of claim 15, further comprising, responsive to determining that the storage device does have available memory for storing the listener attribute, determining that a talker attribute identifying the requested data stream is not stored on the networked computing device and sending a LeaveAll Event out on all other ports that have a discard flag set, the discard flag for each port indicating that a talker attribute that was learned from that port has been discarded from that port.

17. The method of claim 15, further comprising, responsive to determining that the storage device does not have available memory for storing the listener attribute while operating in the second condition, discarding the listener attribute responsive to determining that each talker attribute stored on the networked computing device identifies an advertised stream that is identified in an associated stored listener attribute on the networked computing device.

18. The method of claim 15, wherein discarding the talker attribute comprises discarding the talker attribute responsive to determining that an advertised data stream identified by the talker attribute is not identified by a stored listener attribute stored on the networked computing device.

19. The method of claim 18, wherein discarding the talker attribute comprises propagating the talker attribute as a Talker Failed, discarding the talker attribute, and setting a flag on an ingress port of the networked computing device indicating that the talker attribute was discarded responsive to determining that an advertised data stream identified by the talker attribute is not identified by a stored listener attribute stored on the networked computing device.

20. The method of claim 15, further comprising registering the listener attribute as defined by Stream Reservation Protocol in IEEE 802.1Q responsive to determining that the listener attribute is stored on the networked computing device.

* * * * *